United States Patent [19]

Bäuerle et al.

[11] Patent Number: 5,514,050
[45] Date of Patent: May 7, 1996

[54] METHOD FOR OPERATING A MOTOR VEHICLE HAVING A CONTINUOUSLY VARIABLE TRANSMISSION BY CONTINUOUSLY CHANGING THE TRANSMISSION RATIO OR DETECTING IF A BRAKING OPERATION IS PRESENT AND CONTINUOUSLY ADJUSTING THE TRANSMISSION

[75] Inventors: Peter Bäuerle, Ludwigsburg; Gerhard Keuper, Leonberg; Joachim Luh, Heilbronn; Karl-Heinz Senger, Löchgau; Peter Weiberle, Sachsenheim, all of Germany

[73] Assignee: Robert Bosch GmbH, Stuttgart, Germany

[21] Appl. No.: 221,246

[22] Filed: Mar. 31, 1994

[30] Foreign Application Priority Data

Mar. 31, 1993 [DE] Germany .......................... 43 10 461.4
Sep. 8, 1993 [DE] Germany .......................... 43 30 391.9

[51] Int. Cl.⁶ .................................................. F16H 59/66
[52] U.S. Cl. ............................ 479/118; 477/47; 477/97
[58] Field of Search ................................ 477/34, 37, 42, 477/47, 97, 118, 901

[56] References Cited

U.S. PATENT DOCUMENTS

| | | | |
|---|---|---|---|
| 3,574,289 | 4/1971 | Scheiter et al. | 477/50 |
| 4,039,061 | 8/1977 | Pruvot et al. | 477/37 |
| 4,561,327 | 12/1985 | Niwa et al. | 477/47 |
| 5,231,897 | 8/1993 | Morita . | |
| 5,257,188 | 10/1993 | Sakakibara et al. | 364/424.1 |
| 5,281,541 | 11/1993 | Sakakibara et al. | 364/424.1 |
| 5,287,773 | 2/1994 | Nakawaki et al. | 477/92 |
| 5,364,321 | 11/1994 | Togai et al. | 477/42 |
| 5,389,050 | 2/1995 | Sakai et al. | 477/901 |

FOREIGN PATENT DOCUMENTS

| | | |
|---|---|---|
| 0093312 | 11/1983 | European Pat. Off. . |
| 0180916 | 5/1986 | European Pat. Off. . |
| 0310447 | 4/1989 | European Pat. Off. . |
| 0443424 | 8/1991 | European Pat. Off. . |
| 0532957 | 3/1993 | European Pat. Off. . |
| 2688453 | 9/1993 | France . |
| 2057600 | 4/1981 | United Kingdom . |
| 2197397 | 5/1988 | United Kingdom . |
| WO93/00535 | 1/1993 | WIPO . |
| WO93/00229 | 1/1993 | WIPO . |
| WO93/00531 | 1/1993 | WIPO . |

*Primary Examiner*—Charles A. Marmor
*Assistant Examiner*—Sherry Estremsky
*Attorney, Agent, or Firm*—Walter Ottesen

[57] ABSTRACT

A method for operating a motor vehicle such as a passenger car, which is equipped with a motor and an electronically controlled, continuously variable transmission includes the steps of: detecting a driving state defined by downhill travel; detecting the speed of the vehicle at the start of the downhill travel and storing the vehicle speed; continuously changing the transmission in such a manner that the vehicle speed is substantially maintained while utilizing the braking action of the motor thereby defining a downhill travel motor braking mode of operation; and/or, detecting possible slip at the wheels of the motor vehicle and adjusting a corresponding other, lower gear ratio continuously on the transmission so that the slip is reduced or is entirely eliminated thereby defining a slip-adjustment mode of operation; and/or, detecting if a braking operation is present and, during braking operation, continuously adjusting the transmission by changing the gear ratio to support the brakes of the motor vehicle to define a brake-supporting mode of operation; and/or, continuously changing the gear ratio of the transmission by means of a manually operated actuating device with the change being carried out within the limits of the highest and lowest gear ratio as long as the manual actuation takes place thereby defining a manual mode of operation.

12 Claims, 9 Drawing Sheets

METHOD FOR OPERATING A MOTOR VEHICLE HAVING A CONTINUOUSLY VARIABLE TRANSMISSION BY CONTINUOUSLY CHANGING THE TRANSMISSION RATIO OR DETECTING IF A BRAKING OPERATION IS PRESENT AND CONTINUOUSLY ADJUSTING THE TRANSMISSION

FIELD OF THE INVENTION

The invention relates to a method for operating a motor vehicle such as a passenger automobile equipped with an electronically controlled continuously variable transmission.

BACKGROUNDS OF THE INVENTION

Transmissions are available in the marketplace having a continuously variable transmission ratio utilizing hydraulic controls. These transmissions are built into a motor vehicle and especially a passenger car and have the disadvantage that the complexity of the control is relatively great for a change in the transmission ratio. Only one changing gear ratio characteristic is therefore realized as a rule.

Continuously variable transmissions which are electronically controlled are in development whereby various characteristic fields for an economy mode, normal mode or sport mode are available. In this way, drivability is improved and the desirability is increased.

SUMMARY OF THE INVENTION

The method of the invention affords the advantage that additional functions can be realized in operation which improve the availability, the reliability and the driving pleasure. The method provides that the driving state of downhill travel is determined and the road speed at the start of the downhill travel is detected and stored. The transmission is then continuously changed so that the determined speed is maintained or is essentially maintained while utilizing the braking action of the motor.

From the above, it becomes apparent that a downhill motor-braking operation is present. The determination of the downhill travel can be determined by detecting specific operating parameters and the same applies to the detection of vehicle road speed. If required, corresponding sensors are provided for the determination of the operating parameters. A quasi automatic speed setting for downhill travel is realized by the invention. In addition, or alternatively, it is possible that possible slip at the driven wheels of the motor vehicle is determined and, in dependence thereupon, a different and especially a lower transmission ratio is continuously adjusted on the transmission in such a manner that the slip is reduced or is entirely eliminated. In this way, a slip setting operation is present and the driving safety is improved. In addition, or alternatively, it is also possible to determine whether a braking operation is present and that, during the braking operation, a continuous adjustment of the transmission takes place to support the braking of the motor vehicle. This continuous adjustment changes the transmission ratio and is especially an increasing continuous change of the transmission. This corresponds to a brake-support operation. In addition to the braking action of the braking equipment of the motor vehicle, a motor braking action is obtained by the corresponding continuous adjustment of the ratio of the transmission.

Finally, it is additionally also still possible, or alternately, that a continuous change of the ratio of the transmission takes place by means of an actuating device actuated manually. The change within the limits of the highest and the lowest ratio is carried out as long as the manual actuation by the operator of the motor vehicle (manual operation) takes place. This change in ratio is especially undertaken for normal driving operation. The change in ratio is not stepped as in the state of the art with a shift from one gear into the next; instead, the change in ratio takes place continuously with the driver performing the change by actuating the actuating device (for example, an adjusting lever or dial). It is also possible that the selection lever can be placed in a special track of the shift console and so defines the actuating device at this location.

According to another embodiment of the invention, the downhill travel is detected during the downhill motor braking operation from the conditions: throttle flap angle is at a minimum and especially at zero and the longitudinal acceleration of the motor vehicle is positive. Suitable sensors are provided for this purpose.

It is further advantageous that the downhill motor braking operation is discontinued as soon as the throttle flap angle is greater than the minimum position. The driver of the motor vehicle therefore discontinues this mode of operation when the driver actuates the accelerator pedal.

According to still another embodiment of the invention, the vehicle road speed present when the brakes of the motor vehicle are released is stored as a new value and is applied as a preset value for the motor braking. The brakes are actuated during downhill motor braking operation and the storage takes place directly after the release of the brakes.

In a preferred embodiment of the invention, the road speed detected at the start of the downhill travel is stored as a desired road speed and, during the downhill travel, this desired road speed is compared to the instantaneous road speed then present. If the case now occurs that the deviation between the desired road speed and the instantaneous road speed present exceeds a pregiven threshold, then a new desired road speed is formed. This is provided for the case wherein the function "downhill travel motor braking operation" is active and the motor vehicle runs slower than the desired speed. This would be conceivable, for example, when the driver would allow the vehicle to roll, for example, after moving through a drop in elevation. If the motor vehicle again travels downhill, then the desired road speed must be adapted to the new road speed. Otherwise, the speed controller would only start to brake again after reaching the previous desired road speed. This would lead to a driving condition implausible to the driver.

It is especially advantageous to apply the low-pass filtered instantaneously present road speed for the comparison. In this way, the condition is prevented that short-term fluctuations of the instantaneous vehicle road speed lead to renewal of the motor vehicle desired road speed. Fluctuations of this kind can occur, for example, because of unevenness of the road surface.

Furthermore, the instantaneous road speed can be increased by the above-mentioned threshold for forming the new desired road speed.

It is advantageous when a constant motor braking torque is generated by adjusting the transmission in the brake-supporting mode of operation in dependence upon the actual driving state. Alternately, it is also possible in the braking support operation, to generate a correspondingly dimensioned motor braking torque by a corresponding downward adjustment of the transmission ratio in dependence upon the magnitude of the longitudinal deceleration resulting from the braking action of the brakes. This leads to the condition that a correspondingly high motor braking torque is set for a high longitudinal deceleration and, in contrast, only a correspondingly small motor braking torque is made available for a low longitudinal deceleration. It can be especially provided that the portion of the motor braking action on the total braking torque is constant because of the corresponding setting of the continuously variable transmission.

In manual operation, the adjustment of the transmission ratio can take place with a constant speed of change. Alternatively, it is, however, also possible to preset the speed of change of the transmission ratio adjustment in dependence upon operating parameters which can be selected.

Advantageously, the downhill travel motor braking operation and/or the slip adjustment operation and/or the brake-supporting operation and/or the manual operation can all take place without intervening in the motor control. Alternatively, it is, however, also possible that the continuous adjustment of the transmission ratio is simultaneous with an intervention in the motor control for the above-mentioned operating modes.

The change of the ratio of the transmission takes place automatically in the following: downhill travel motor braking operation and/or slip adjustment operation and/or brake-supporting operation, that is, the change of the ratio takes place without the necessity of an intervention by the driver.

It is especially advantageous that a controlled change of the ratio takes place during the following: downhill travel motor braking operation and/or slip adjustment operation and/or brake-supporting operation and/or manual operation. The preset value for the continuous adjustment does not therefore take place on the basis of a characteristic or the like but by a control.

An advantageous configuration of the control in the downhill travel motor braking operation comprises that the motor speed or the transmission input rpm is used as a control variable and is compared to a corresponding guide variable. The gear ratio of the transmission is changed in dependence upon this comparison result in the sense of an approximation of the control variable to the guide variable. The corresponding guide variable is defined by a motor desired rpm or a transmission input desired rpm and is determined from the deviation between the desired speed and the instantaneous motor vehicle speed. In this way, use can be made of a motor rpm control, which can already be present in its total concept, by means of a transmission gear ratio change.

Furthermore, it is advantageous for the control in the downhill travel motor braking operation that the controller is provided with a proportional component and a differential component.

It is especially advantageous also for the control in the downhill travel motor braking operation to low-pass filter the signal of the instantaneous motor vehicle speed. In this way, short-term fluctuations of the instantaneous motor vehicle speed are avoided which could otherwise lead to unwanted control operations. The fluctuations of the motor vehicle speed can, for example, occur because of an unevenness in the road surface. Such uneven road surfaces could lead to a change in the motor rpm which, in turn, contributes to a reduction of the driving comfort.

Furthermore, it is advantageous to determine a desired overrun force from the deviation between the desired speed and the instantaneous motor vehicle speed. A desired motor rpm can then be computed in dependence upon this desired overrun force. In order to avoid damage to the motor, the change of the gear ratio of the transmission is only undertaken so that the motor rpm remains within the frame of its permitted limits in at least one or more of the following modes of operation: downhill travel motor braking operation, slip adjustment operation, brake supporting operation and manual operation. For this purpose, a corresponding open-loop or closed-loop control intervention takes place.

BRIEF DESCRIPTION OF THE DRAWINGS

The invention will now be described with reference to the drawings wherein.

DESCRIPTION OF THE PREFERRED
EMBODIMENTS OF THE INVENTION

The above modes of operation will now be discussed in greater detail.

In the downhill travel motor braking mode, the actual speed of the motor vehicle is stored at the time point at which the downhill travel is detected. The downhill travel is present when the following conditions are satisfied: the throttle flap angle is minimum or equal to zero; and, longitudinal acceleration is positive. The determined speed is stored and the transmission gear ratio is automatically controlled while utilizing the continuously variable change possibility in that the motor vehicle is maintained at the stored speed (start speed) without intervention into the motor control while utilizing the motor braking action. This takes place in the context of the permissible motor rpm. This special function is discontinued as soon as the driver again accelerates, that is, when the driver actuates the throttle flap. If the operator actuates the brake pedal during downhill travel, then the speed present after releasing the brake pedal is stored as a new desired value and is used for the speed control which follows for continuing the downhill travel.

Figure 1:
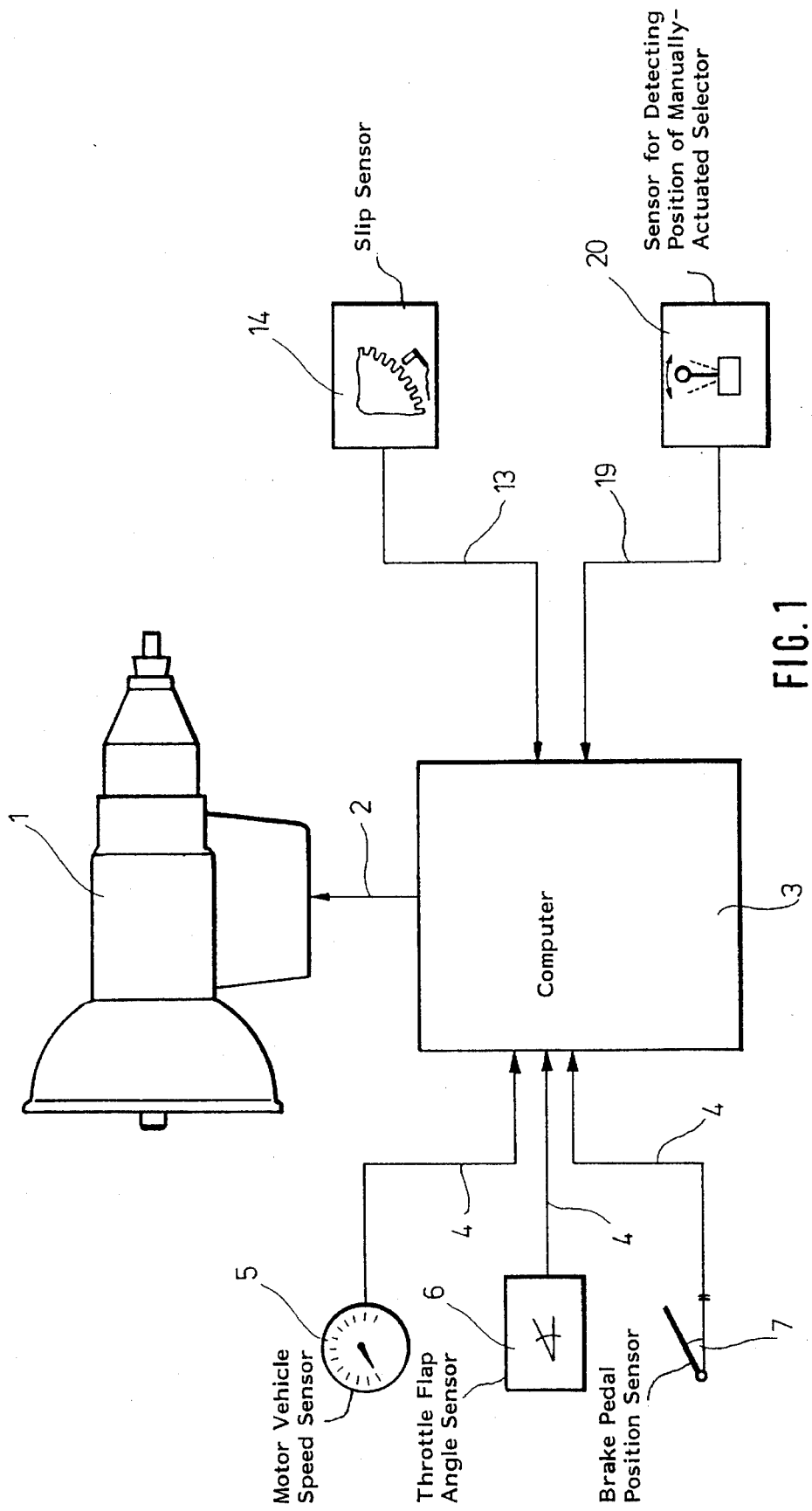
FIG. 1 is a block circuit diagram of a transmission arrangement of a motor vehicle.

The block diagram of FIG. 1 shows the arrangement for the downhill travel motor braking mode of operation. The continuously variable transmission 1 is connected via an electric connection 2 to a computer 3. Various data are supplied to the computer 3 as input variables via electric lines 4. A sensor 5 supplies the motor vehicle speed, a sensor 6 the throttle flap angle of the motor of the corresponding motor vehicle and a sensor 7 supplies the computer 3 with data as to the position of the brake pedal of the motor vehicle. The data originating from the sensors 5 to 7 are processed by the computer 3 which transmits at its output control data to control the transmission via the electric connection 2.

Figure 2:
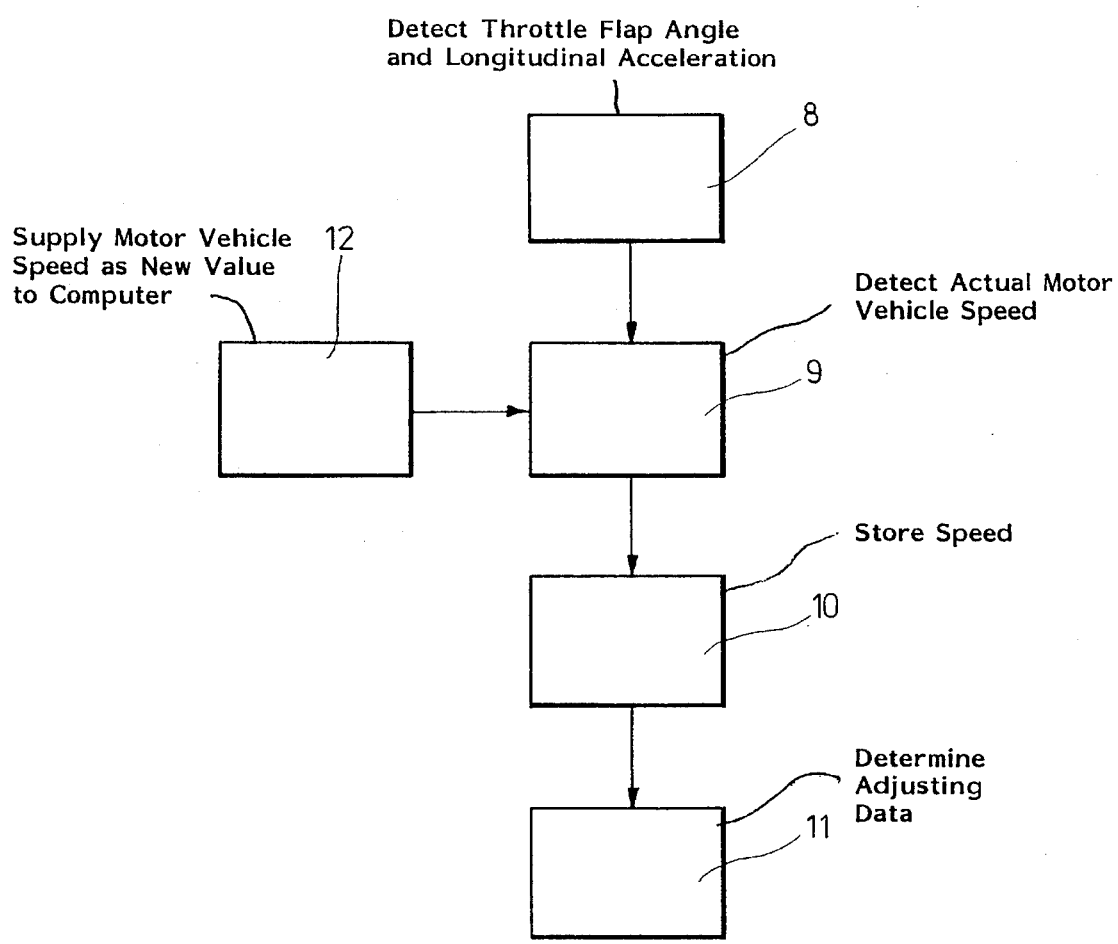
FIG. 2 is a block diagram for the downhill travel motor braking mode of operation.

The block diagram of FIG. 2 shows the operation of the computer of FIG. 1. In a first work step 8 of the computer 3, throttle flap angle and longitudinal acceleration are detected to determine if a downhill travel is present. The throttle flap angle is supplied by sensor 6 and the longitudinal acceleration can be determined by correspondingly processing the signal of the sensor 5 which detects the speed. A derivative of the speed as a function of time makes possible the determination of the longitudinal acceleration.

In the following work step 9 of the computer 3, the computer detects the actual speed (sensor 5) which is present at the time point of the start of the downhill travel. The speed is stored in the next method step 10. Finally, the computer 3 determines the adjusting data for the continuously variable transmission in method step 11 in such a manner that the speed of the motor vehicle corresponds to the speed stored in method step 10 for the downhill travel. These data are supplied to the continuously variable transmission 11 and then lead to the pregiven adjustment so that the motor vehicle maintains the pregiven speed during the downhill travel. The sensor 7 detects when the operator of the motor vehicle actuates the brakes thereof during downhill travel and transmits the actuation of the brakes to the computer 3. When the operator actuates the brakes, the motor vehicle speed present after the release of the brakes of the vehicle actuated during the downhill motor braking mode of operation is supplied to the computer as a new value in a method step 12 of the computer, that is, this new speed is detected in the method step 9 and stored in method step 10 and thereafter processed in method step 11.

The described embodiment of FIGS. 1 and 2 corresponds to the most preferred embodiment of the downhill travel motor braking operation.

An embodiment for adjusting or controlling the speed of the motor vehicle in the downhill travel mode of operation (method step 11) is described with respect to FIGS. 7 to 10 at the end of this disclosure.

The desired motor vehicle speed can be reset after a braking operation induced by the driver by actuating the brakes of the vehicle. In addition to resetting the desired motor vehicle speed during the overrun operation, the motor vehicle speed (desired speed) detected at the start of the downhill travel can be reset for specific operating conditions. Such operating conditions are present with respect to the invention when the deviation between the desired speed and the instantaneous motor vehicle speed exceeds a threshold which is pregiven. This is explained in the following with reference to FIG. 6.

In method step 60 (corresponds to step 10 of FIG. 2), the motor vehicle speed, which is measured at the start of the downhill travel, is stored as the motor vehicle desired speed $V_{des}$. The instantaneous motor vehicle speed $V_{act}$ is detected by sensor 64 and is compared in step 61 (corresponds to step 11 of FIG. 2) to the motor vehicle desired speed $V_{des}$ and the gear ratio of the continuously variable transmission is changed in such a manner that the instantaneous motor vehicle speed $V_{act}$ is controlled to the motor vehicle desired speed $V_{des}$. During this control, the validity of the motor vehicle desired speed $V_{des}$ is continuously checked. For this purpose, the difference ($V_{des}-V_{actF}$) between the instantaneously valid motor vehicle speed $V_{des}$ and the instantaneously present, preferably low-pass filtered, motor vehicle speed $V_{actF}$ is formed and is compared to a threshold T which can be pregiven. If this difference exceeds the threshold, then the motor vehicle desired speed $V_{des}$ is newly set to the value ($V_{actF}+T$) in step 63 and is supplied to the control 61 (11).

If the difference does not exceed the threshold T, then the control is continued to the old value of the motor vehicle desired speed $V_{des}$.

In step 63, the preferably low-pass filtered signal of the instantaneous motor vehicle speed is applied so that short-term fluctuations of the instantaneous motor vehicle speed do not lead to a renewal of the motor vehicle desired speed. These short-term fluctuations can, for example, be caused by unevenness of the road surface.

Figure 6:
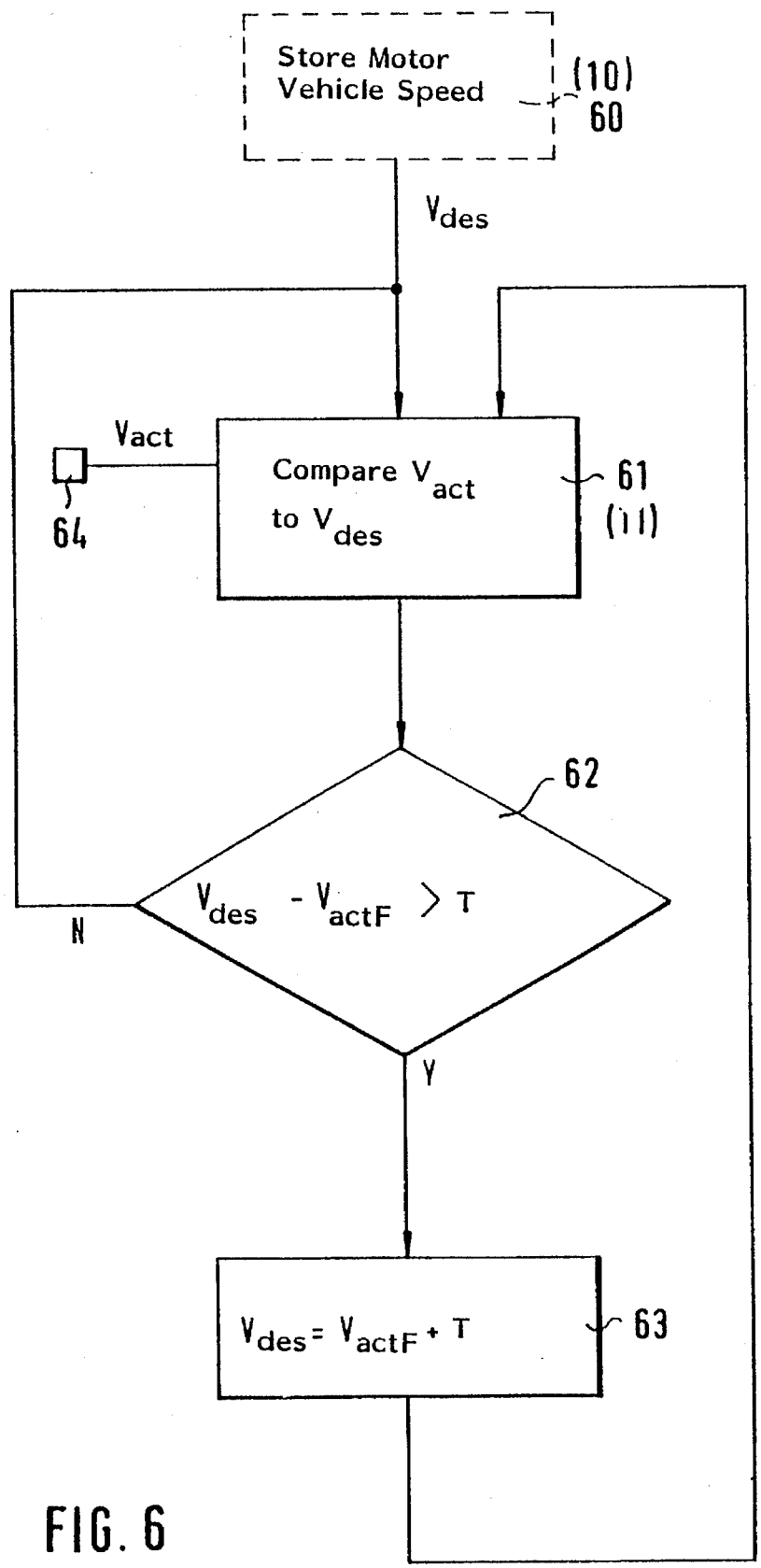
FIG. 6 is a second block diagram for the downhill travel motor braking mode of operation.

With the embodiment described with respect to FIG. 6, an adaptation of the desired speed to the motor vehicle speed is guaranteed for travel which becomes slower on a slighter drop in elevation. In this way, the condition is obtained that the motor vehicle immediately moves into the overrun operation when the slope again increases without accelerating unexpectedly.

In the slip adjustment mode of operation, the slip at the driven wheels of the motor vehicle is detected by suitable means such as with the aid of sensors. An electronically controlled continuous change of the gear ratio of the transmission takes place in dependence upon the detected value in such a manner that the slip is reduced or the slip is prevented. What is characterizing here is that not any desired, especially lower ratio is set, but that a control operation takes place utilizing the continuous change possibility that a possible slip is eliminated, preferably without intervention in the motor control of the motor vehicle. Alternatively, it is, however, also possible to utilize the above-mentioned function in combination with a motor control.

Figure 3:
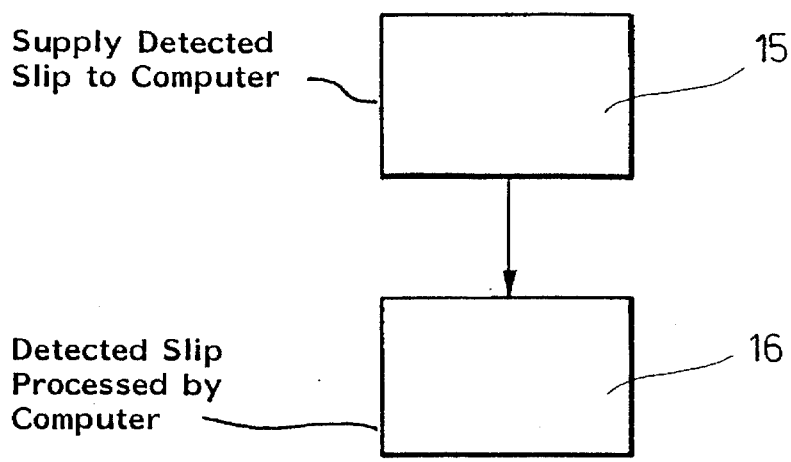
FIG. 3 is a block diagram of the slip adjustment mode of operation.

FIG. 1 shows that the computer 3 is connected via an electric line 13 to a sensor 14 which determines possibly occurring slip at the driven wheels of the motor vehicle. The corresponding operation of the computer 3 is shown in the block diagram of FIG. 3. In method step 15, the slip determined by the sensor 14 is supplied to the computer 3 as an input variable. The detected slip is processed by the computer 3 and an output variable is made available in method step 16. This output variable is transmitted further to the transmission control of the automatic transmission whereby the changeable transmission 1 is adjusted in such a manner that the slip is eliminated. The above descriptions define the most preferred embodiment of the slip adjustment mode of operation.

In the brake-supporting mode of operation, a control takes place while utilizing the continuous changing capability of the transmission in order to always provide a constant motor braking torque insofar as a braking operation is carried out. This operation is especially dependent upon the actual driving state. The brakes of the motor vehicle are then supported by the motor braking operation.

Figure 4:
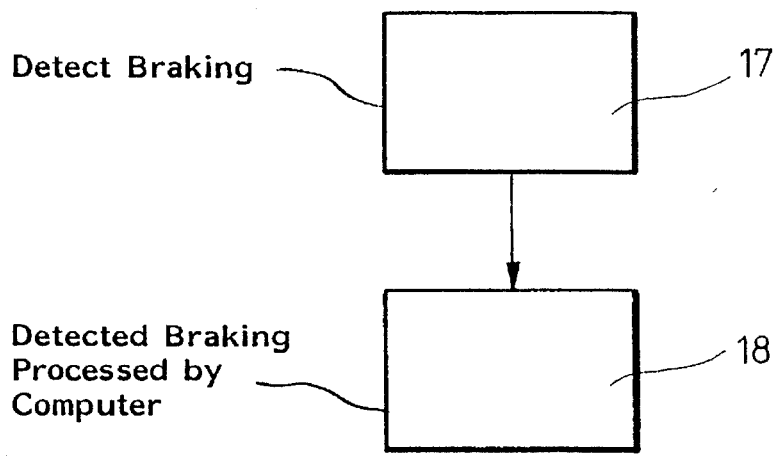
FIG. 4 is a block diagram of the brake supporting mode of operation.

The block diagram of FIG. 1 includes the sensor 7 which operates to detect a braking operation. The brake-supporting mode of operation is shown in the block diagram of FIG. 4 wherein an occurring braking operation is detected by the computer 3 in a method step 17. The computer 3 processes the data resulting therefrom and generates a corresponding variable in method step 18 which, in turn, is supplied to the transmission control of the continuously variable transmission. In this way, the continuously variable transmission is adjusted in such a manner that a constant motor braking torque is present. This is the most preferred embodiment of the brake-supporting mode of operation.

As an alternative to the constant motor braking torque referred to above, it is also possible to adapt the motor braking torque to the variable of a longitudinal deceleration of the motor vehicle by means of a corresponding continuous adjustment of the transmission. For a large longitudinal deceleration, a correspondingly large motor braking torque is adjusted or controlled. In contrast, for a low longitudinal acceleration, a correspondingly low motor braking torque is adjusted. Preferably, one can proceed in that the component of the motor braking action is constant with respect to the entire braking torque.

The motor vehicle has an automatic transmission function because of its electronically controlled continuously variable transmission, that is, the continuously variable gear ratio is automatically adjusted. Furthermore, it is also possible to simulate a shift transmission. The driver then has the possibility of selecting a desired gear ratio in the context of the gear stages, which are basically freely definable, but are then fixedly pregiven for the driver.

In addition to the foregoing, and according to a feature of the invention, the possibility is provided in the defined manual selection mode of operation, to continuously set a desired greater or lesser gear ratio rather than discrete gear steps. This possibility is alternative or is in addition to the continuous change possibility with the aid of a manual actuating unit (selector or the like). As long as the actuating unit is actuated, a change in gear ratio takes place, preferably at a constant change speed. It is understood that this change can itself only take place within the limits of the highest and lowest gear ratio.

Figure 5:
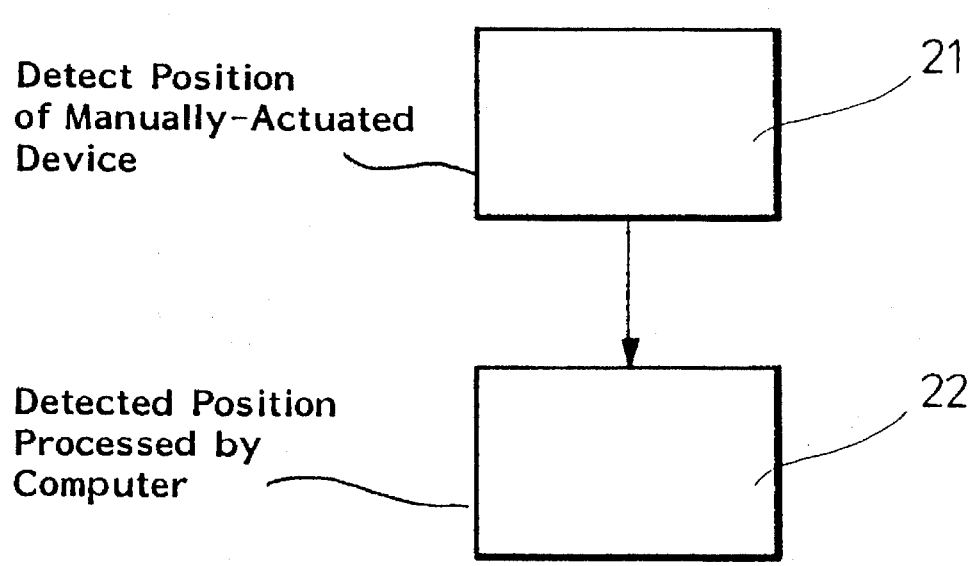
FIG. 5 is a block diagram for the manual mode of operation.

FIG. 1 shows that the computer 3 receives the data of a further sensor 20 via an electrical line 19. The sensor 20 detects the position of an actuating device which can be actuated by the driver of the motor vehicle, preferably in the manual mode of operation. The data coming from the sensor 20 are supplied to the computer 3 in a method step 21 in accordance with the block diagram of FIG. 5. The computer 3 then forms an output variable in the method step 22 which is supplied to the transmission control of the continuously variable transmission 1. The continuously changeable transmission is correspondingly adjusted in dependence upon whether the operator of the motor vehicle operates the manually-actuated device (manual mode of operation) in the direction of a higher or lower gear ratio. This is the most preferred embodiment of the manual mode of operation.

The control of the speed of the motor vehicle in the downhill mode of operation is described in FIGS. 7 to 10 in the context of an embodiment.

Figure 7:
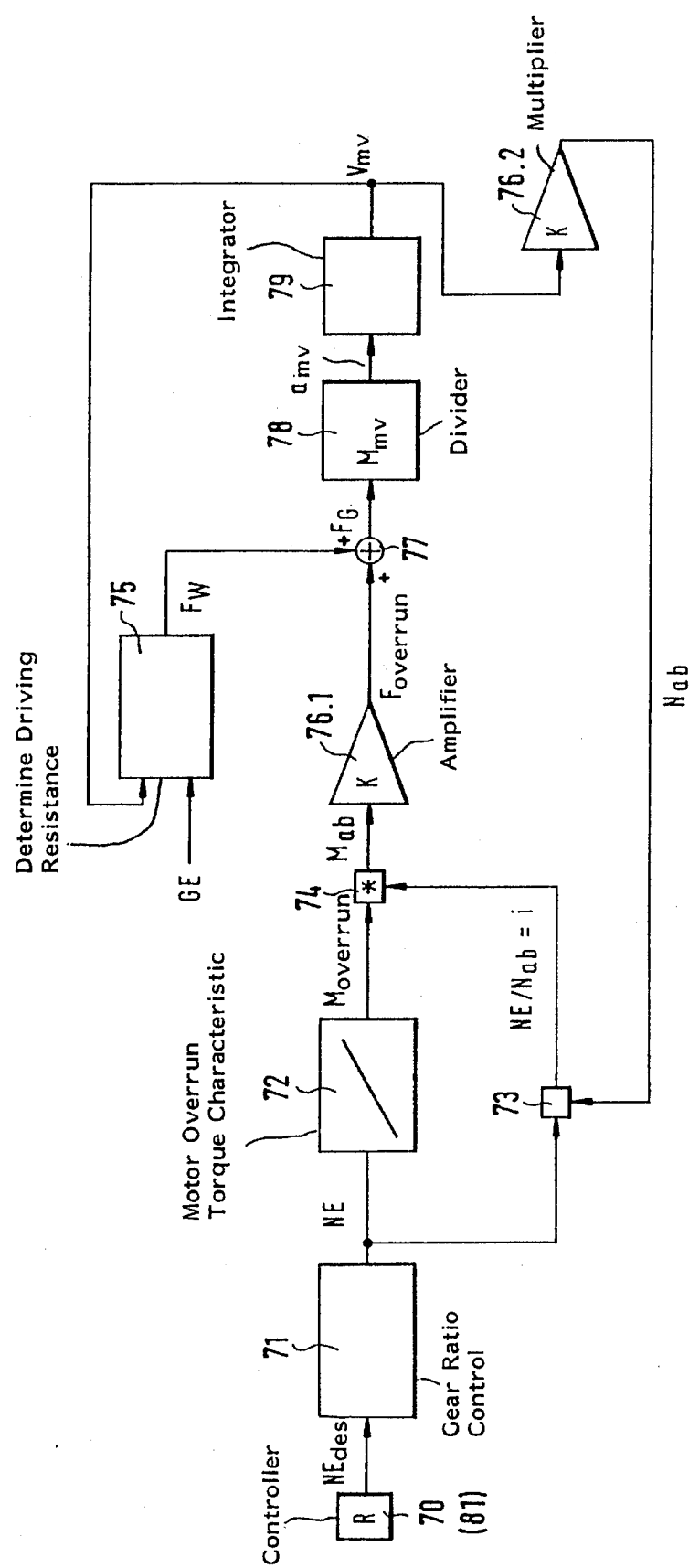
FIG. 7 is a control path for the downhill travel motor braking mode of operation.

A block diagram of the control path is shown in FIG. 7. The controller R is described in greater detail with respect to FIGS. 8, 9 and 10. The controller R supplies the desired value for the motor rpm $NE_{des}$ as the actuating variable. The subordinated gear ratio control 71 correspondingly adjusts the transmission gear ratio of the continuously variable transmission. In this way, a deceleration occurs for the setting of the motor rpm NE which can be shown as a $T_1$-member or a $T_2$-member. The motor rpm NE is the same as the transmission input rpm when the clutch is engaged. The motor rpm NE is provided at the output end of the subordinated gear ratio control 71. The overrun torque $M_{overrun}$ generated by the motor is determined in the block 72 from the motor rpm NE by means of a motor overrun torque characteristic. The overrun torque $M_{overrun}$ is multiplicatively logically combined by the multiplier 74 with the transmission gear ratio i. The transmission output torque $M_{ab}$ is then present at the output end of the multiplier 74. The transmission gear ratio i results herefrom as:

$$i = NE:Nab$$

The transmission output rpm Nab reflects the output rpm of the transmission. In the amplifier stage 76.1, the transmission output torque Nab is amplified by a factor K to obtain the overrun force $F_{overrun}$ acting on the motor vehicle.

The driving resistance of the motor vehicle is determined in block 75 in dependence upon the instantaneous motor vehicle speed $F_{mv}$ and the gradient or slope GE which is just being driven. The air resistance of the motor vehicle, for example, and the influence of the tires are significant influencing variables which are applied to determine the driving resistance 75. The variable $F_W$ is then present at the output end of unit 75. This variable $F_W$ represents the entire force acting on the motor vehicle. This total force $F_W$ is additively combined in the logic circuit 77 with the overrun force $F_{overun}$ acting on the motor vehicle. In this way, the total force $F_G$ which acts on the motor vehicle is obtained. A division 78 by the mass $M_{mv}$ of the motor vehicle supplies the motor vehicle acceleration $a_{mv}$ which is converted to the instantaneous motor vehicle speed $V_{mv}$ by an integrator 79. The transmission output rpm Nab can be determined in block 76.2 from the instantaneous motor vehicle speed $V_{mv}$ by multiplication by a value specific to the motor vehicle.

Figure 8:
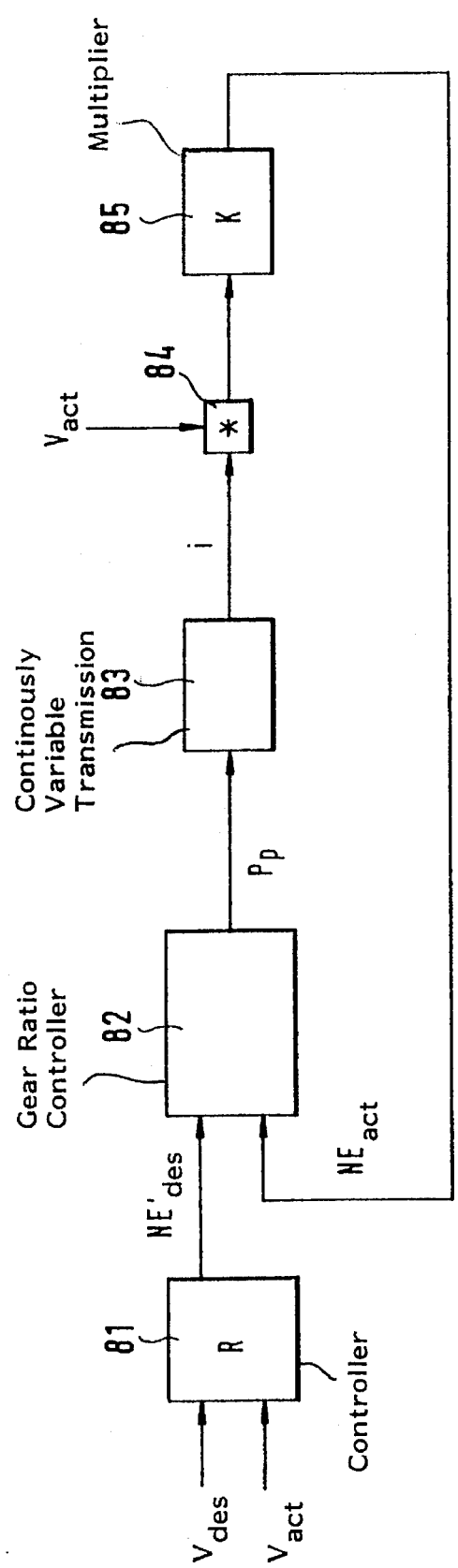
FIG. 8 is a first block diagram of the downhill travel motor braking mode of operation.

A first block diagram for the downhill travel mode of operation is shown in FIG. 8. As already mentioned, the motor vehicle desired speed $V_{des}$ and the instantaneous motor vehicle speed $V_{act}$ are supplied to the controller 81. As shown with respect to FIGS. 9 and 10, a desired value $NE'_{des}$ for the motor rpm is present at the output end of the controller 81. This desired value for the motor rpm is supplied to the gear ratio controller 82 which determines the primary pressure $P_p$ for the continuously variable transmission 83 from the difference of the desired value of the motor rpm and the instantaneous actual value $NE_{act}$. The gear ratio i at the transmission 83 is adjusted by means of this primary pressure. The actual motor rpm $NE_{act}$ is determined by a multiplication 84 with the instantaneous motor vehicle speed $V_{act}$ and by multiplication with a parameter K (step 85) which is specific to the motor vehicle. It is therefore the essence of the method of the invention that the motor rpm or the transmission input rpm as a control variable is compared to a corresponding guide variable and, the gear ratio of the transmission is changed in the sense of an approximation of this control variable to the guide variable in dependence upon the result of this comparison.

Figure 9:
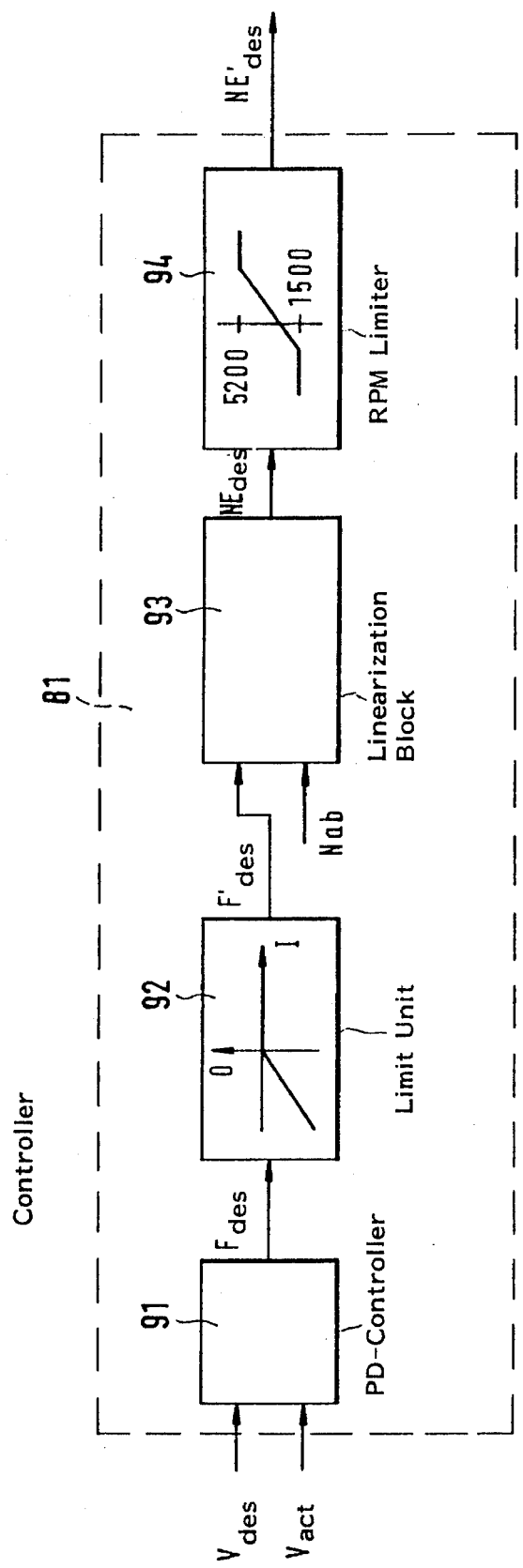
FIG. 9 is a second block diagram for the downhill travel motor braking mode of operation; and, FIG. 10 is a third block diagram for the downhill travel motor braking mode of operation.

In FIG. 9, the operation of the controller 81 is explained in greater detail. For this purpose, the values for the desired speed $V_{des}$ and for the instantaneous actual speed $V_{act}$ of the motor vehicle are supplied to a PD-controller 91. The PD-controller is described with reference to FIG. 10 and computes the required overrun force $F_{des}$ from the desired and actual speeds. This required overrun force $F_{des}$ is limited to negative values by means of a limit unit 92 because the control according to the invention is intended to operate only in a braking manner. The overrun forces determined by means of the PD-controller 91 are set to zero by this limit unit 92. These overrun forces are a propelling force. This is, for example, then the case when the pregiven desired speed is greater than the actual speed. In this case, the limit unit 92 prevents the motor vehicle from being actively accelerated.

The overrun force $F'_{des}$ desired from the motor is then present at the output end of the limit unit 92. This overrun force in addition to the transmission output rpm Nab is supplied to the linearization block 93. The transfer function of the linearization block will now be described.

The linearization block determines the required motor rpm $NE_{des}$ from the inputted overrun force. This linearization is based upon the following considerations. On approximation, the following can be assumed for the overrun torque.

The transmission gear ratio then results as:

$$i = NE/Nab = Mab/ME \quad (1)$$

wherein NE is the transmission input rpm which corresponds to the motor rpm $N_{mot}$ with the clutch engaged and $N_{ab}$ defines the above-mentioned transmission output rpm. ME is the transmission input torque and $M_{ab}$ is the transmission output torque.

$$M_{overrun} = f(NE) \quad (2)$$
$$= K_s^*(Nmot - Nmot_0) = K_s^*(NE - Nmot_0)$$

wherein the values $K_S$ and $Nmot_0$ are the variables specific to the motor or motor vehicle. The value $Nmot_0$ then provides the motor rpm wherein the motor generates no braking torque or only a slight braking torque.

The following equation results from equations (1) and (2) above:

$$Mab = (NE/Nab)^*K^*(NE - Nmot_0) \quad (3)$$

The conversion of the transmission output torque Mab to the motor vehicle yields the following:

$$F_{overrun} = K_{SF}^* Mab \quad (4)$$
$$= K_{SF}^* K_S^*(NE/Nab)^*(NE - Nmot_0) \quad (2)$$

After combining the two constants to $K_{overrun}$:

$$K_{overrun} = K_{SF}^* K_S \quad (6)$$

from which follows:

$$F_{overrun} = K_{overrun}^*(NE/Nab)^*(NE - Nmot_0) \quad (7)$$

In this way, the computation rule for the linearization block 93 is given by:

$$NE_{des} = 0.5^*Nmot_0 + [0.25^*Nmot_0^2 + F_{des}^*(Nab/K_{overrun})]^{1/2} \quad 45$$

The above-mentioned computation rule then defines the transfer function of the linearization block 93, that is, a desired value $NE_{des}$ for the motor rpm is determined by means of the linearization block 93 from the desired overrun force $F'_{des}$ and the output rpm Nab. The linearization block 93 then determines the desired motor rpm $NE_{des}$ from the overrun force input. The required motor rpm $NE_{des}$ is limited in the unit 94 to minimum and maximum values ($NE_{min}$ and $NE_{max}$). An overrun of the motor is prevented by the rpm limiter 94. The desired value $NE'_{des}$ for the motor rpm is then present at the output end of the rpm limiter 94.

Figure 10:
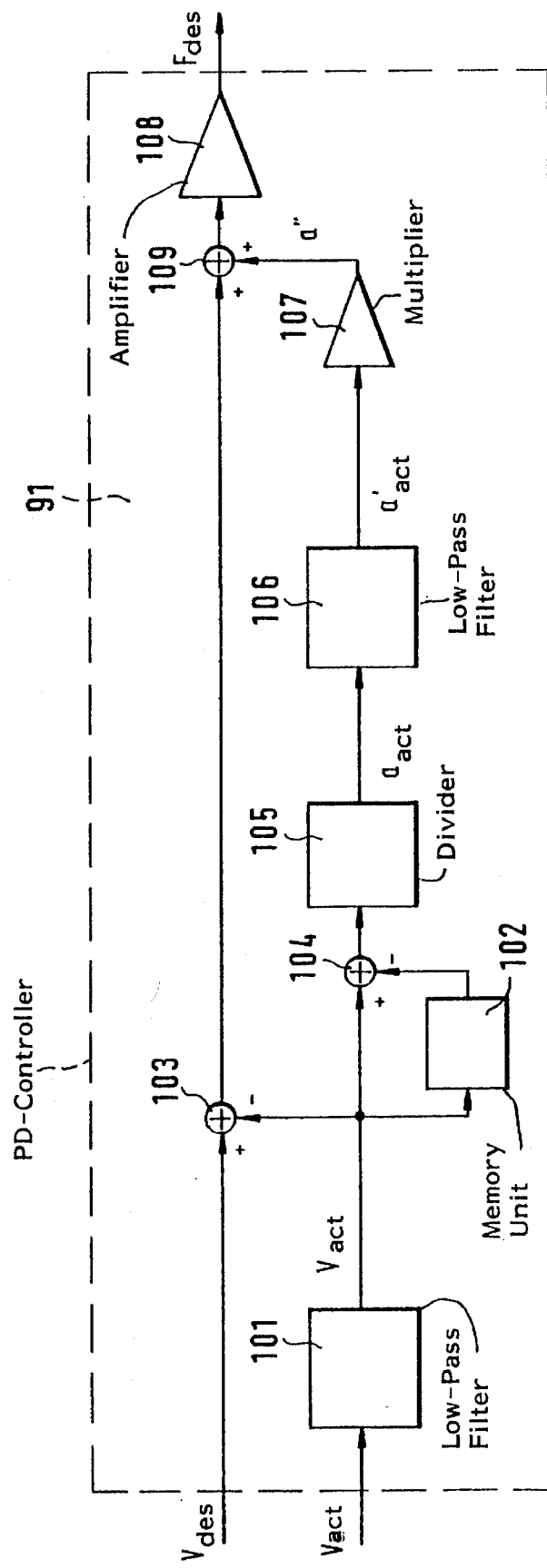

Because of the linearization, the PD-controller can now be designed as a linear i-$T_1$-path or i-$T_2$-path. The structure of the discontinuous PD-controller 91 is shown in FIG. 10.

It has been shown to be advantageous to smooth the signal $V_{act}$ of the instantaneous motor vehicle speed with a low-pass filter 101. The smoothed motor vehicle actual speed signal $V_{actF}$ is at the output end of the low-pass filter 101. The desired signal present at the output end of the PD-controller 91 for the overrun force $F_{des}$ (actuating signal) is made up of a feedback of the control deviation (proportional portion) and a superposition of the differentiated speed signal $a''_{actF}$ (D-component).

The signal $V_{des}$, which represents the desired motor vehicle speed, is supplied to the adder unit 103 to form the P-controller component. In the adder unit 103, the motor vehicle actual speed $V_{actF}$, which is smoothed in the low-pass filter 101, is superposed on the signal $V_{des}$. The signal $V_{actF}$, which represents the low-pass-smoothed actual speed, is then supplied to the adder unit 103 with a negative sign. The control deviation between the desired and actual values of the motor vehicle speed is then applied as P-component to the adder unit 109.

The D-controller component is realized in such a manner that the signal $V_{act}$ which represents the instantaneous motor vehicle speed, is processed by the low-pass filter 101 to the low-pass-smoothed signal $V_{actF}$. A value of the motor vehicle actual speed is stored in the memory unit 102 and is superposed with a negative sign in the adder unit 104 on an instantaneous actual speed value following the sampling time T. A low-pass filtered signal $a_{actF}$ representing the motor vehicle acceleration is obtained by the division by the sampling time in the unit 105. The units 102, 104 and 105 then define a differentiator. The low-pass filtered motor vehicle acceleration $a_{actF}$ is supplied to a further low pass 106 and is filtered to form the signal $a'_{actF}$. The low-pass filtered motor vehicle actual acceleration is multiplied by a time constant in the unit 107. In this way, the dynamic of the control operation can be influenced. A signal $a''_{actF}$ representing the motor vehicle actual acceleration is now present as a D-controller component at the output end of the unit 107.

The above-described P-controller component is additively superposed with the D-controller component by means of the adder unit 109 and can be processed by means of the amplifier stage 108 to the signal representing the desired overrun force $F_{des}$.

The further processing of the signal $F_{des}$ representing the overrun desired force as output signal of the PD-controller 91 was described with respect to FIG. 9.

The method according to the invention ensures that the downhill travel is at constant speed. A more pleasant downhill travel is provided for the driver of the motor vehicle as compared to a stepped automatic transmission or the known CVT automatic transmissions because the driver must not continuously brake. This also reduces wear on the brake pads.

The linearization block makes possible the stable operation of the controller for all speed and load cases. A quiet control performance is obtained by means of the special configuration of the PD-controller (filtering and feedback of the acceleration).

It is understood that the foregoing description is that of the preferred embodiments of the invention and that various changes and modifications may be made thereto without departing from the spirit and scope of the invention as defined in the appended claims.

What is claimed is:

1. A method of operating a motor vehicle such as a passenger car, the motor vehicle being equipped with a motor and an electronically controlled, continuously variable transmission, the method comprising the steps of:

detecting a driving state defined by downhill travel during which the motor vehicle has a longitudinal acceleration;

detecting the speed of the vehicle at the start of the downhill travel and storing the vehicle speed;

continuously changing the transmission in such a manner that said vehicle speed is substantially maintained while utilizing the braking action of the motor thereby defining a downhill travel motor braking mode of operation; and, during said downhill travel motor braking mode of operation, detecting the downhill travel by satisfying the conditions: minimal throttle flap angle and said longitudinal acceleration of the motor vehicle being positive.

2. A method of operating a motor vehicle such as a passenger car, the motor vehicle being equipped with a motor and an electronically controlled, continuously variable transmission, the method comprising the steps of:

detecting a driving state defined by downhill travel;

detecting the speed of the vehicle at the start of the downhill travel and storing the vehicle speed;

continuously changing the transmission in such a manner that said vehicle speed is substantially maintained while utilizing the braking action of the motor thereby defining a downhill travel motor braking mode of operation;

making a controlled adjustment of the gear ratio in the downhill travel motor braking mode of operation;

detecting the instantaneous motor rpm ($NE_{act}$) or the transmission input rpm;

comparing the instantaneous motor rpm ($NE_{act}$) or the transmission input rpm as a control variable to a corresponding guide variable ($NE_{des}$); and, in dependence upon this comparison result, changing the gear ratio (i) of the transmission in the sense of an approximation to the guide variable.

3. A method of operating a motor vehicle such as a passenger car, the motor vehicle being equipped with a motor and an electronically controlled, continuously variable transmission, the method comprising the steps of:

detecting a driving state defined by downhill travel;

detecting the speed of the vehicle at the start of the downhill travel and storing the vehicle speed;

continuously changing the transmission in such a manner that said vehicle speed is substantially maintained while utilizing the braking action of the motor thereby defining a downhill travel motor braking mode of operation;

using a controller having a proportional component and a differential component for controlling said transmission; and, making a controlled adjustment of the gear ratio in the downhill travel motor braking mode of operation.

4. A method of operating a motor vehicle such as a passenger car, the motor vehicle being equipped with a motor and an electronically controlled, continuously variable transmission, the method comprising the steps of:

detecting a driving state defined by downhill travel;

detecting the speed of the vehicle at the start of the downhill travel and storing the vehicle speed;

continuously changing the transmission in such a manner that said vehicle speed is substantially maintained while utilizing the braking action of the motor thereby defining a downhill travel motor braking mode of operation;

detecting the instantaneous vehicle speed $V_{act}$;

low-pass filtering said instantaneous vehicle speed $V_{act}$ and applying the low-pass filtered instantaneous vehicle speed $V_{actF}$ as an actual variable to a controller for said transmission; and, making a controlled adjustment of the gear ratio in the downhill travel motor braking mode of operation.

5. A method of operating a motor vehicle such as a passenger car, the motor vehicle being equipped with a motor and an electronically controlled, continuously variable transmission, the method comprising the steps of:

detecting a driving state defined by downhill travel;

detecting the speed of the vehicle at the start of the downhill travel and storing the vehicle speed;

continuously changing the transmission in such a manner that said vehicle speed is substantially maintained while utilizing the braking action of the motor thereby defining a downhill travel motor braking mode of operation;

storing the detected motor vehicle speed as a desired speed $V_{des}$ at the start of downhill travel;

detecting the instantaneous motor vehicle speed $V_{act}$ during said downhill travel;

comparing said desired speed $V_{des}$ to the instantaneous motor vehicle speed $V_{act}$ during downhill travel;

forming a new desired speed in the case where the deviation between the desired speed $V_{des}$ and the instantaneous vehicle speed $V_{act}$ exceeds a pregiven threshold T;

low-pass filtering the instantaneous vehicle speed $V_{act}$ to obtain a low-pass filtered instantaneous $V_{actF}$; and, making the comparison by applying the low-pass filtered instantaneous vehicle speed $V_{actF}$.

6. A method of operating a motor vehicle such as a passenger car, the motor vehicle being equipped with a motor and an electronically controlled, continuously variable transmission, the method comprising the steps of:

detecting a driving state defined by downhill travel;

detecting the speed of the vehicle at the start of the downhill travel and storing the vehicle speed;

continuously changing the transmission in such a manner that said vehicle speed is substantially maintained while utilizing the braking action of the motor thereby defining a downhill travel motor braking mode of operation;

making a controlled adjustment of the gear ratio in the downhill travel motor braking mode of operation;

storing the detected motor vehicle speed as a desired speed $V_{des}$ at the start of downhill travel; detecting the instantaneous motor vehicle speed $V_{act}$ during said downhill travel;

comparing said desired speed $V_{des}$ to the instantaneous motor vehicle speed $V_{act}$ during downhill travel;

forming a new desired speed in the case where the deviation between the desired speed $V_{des}$ and the instantaneous vehicle speed $V_{act}$ exceeds a pregiven threshold T; and, increasing the instantaneous vehicle speed $V_{act}$ by the threshold T to form the new desired speed.

7. A method of operating a motor vehicle such as a passenger car, the motor vehicle being equipped with a motor end an electronically controlled, continuously variable transmission, the method comprising the steps of:

detecting if a braking operation is present and, during braking operation, continuously adjusting the transmission by changing the gear ratio to support the brakes of the motor vehicle to define a brake-supporting mode of operation;

generating a constant motor brake torque by adjusting the transmission in said brake-supporting mode of operation.

8. A method of operating a motor vehicle such as a passenger car, the motor vehicle being equipped with a motor and an electronically controlled, continuously variable transmission, the method comprising the steps of:

continuously changing the gear ratio of the transmission by means of a manually operated actuating device with the change being carried out within the limits of the highest and lowest gear ratio as long as the manual actuation takes place thereby defining a manual mode of operation; and, adjusting the gear ratio at a constant speed of change in the manual mode of operation.

9. A method of operating a motor vehicle such as a passenger car, the motor vehicle being equipped with a motor and an electronically controlled, continuously variable transmission, the method comprising the steps of:

detecting if a braking operation is present and, during braking operation, continuously adjusting the transmission by changing the gear ratio to support the brakes of the motor vehicle to define a brake-supporting mode of operation;

adjusting the motor braking torque in such a manner that its proportion of the entire braking torque is always constant.

10. A method of operating a motor vehicle such as a passenger car, the motor vehicle being equipped with a motor and an electronically controlled, continuously variable transmission, the method comprising the steps of:

detecting if a braking operation is present and, during braking operation, continuously adjusting the transmission by changing the gear ratio to support the brakes of the motor vehicle to define a brake-supporting mode of operation;

adjusting the motor braking torque in such a manner that its proportion of the entire braking torque is variably dimensioned in accordance with a fixed characteristic such as with the aid of a characteristic line.

11. A method of operating a motor vehicle such as a passenger car, the motor vehicle being equipped with a motor and an electronically controlled, continuously variable transmission, the method comprising the steps of:

detecting a driving state defined by downhill travel;

detecting the speed of the vehicle at the start of the downhill travel and storing the vehicle speed;

continuously changing the transmission in such a manner that said vehicle speed is substantially maintained while utilizing the braking action of the motor thereby defining a downhill travel motor braking mode of operation;

storing the detected vehicle speed as desired speed $V_{des}$ at the start of the downhill travel;

detecting the instantaneous vehicle speed $V_{act}$ and, by means of a controlled change of the gear ratio, causing the instantaneous vehicle speed $V_{act}$ to approximate the desired speed $V_{des}$;

with a desired overrun force $F_{des}$ being determined from the deviation between the desired speed $V_{des}$ and the instantaneous speed $V_{act}$; and, with a desired motor rpm $NE_{des}$ being determined in dependence upon this desired overrun force $F_{des}$;

making a controlled adjustment of the gear ratio in the downhill travel motor braking mode of operation.

12. A method of operating a motor vehicle such as a passenger car, the motor vehicle being equipped with a motor and an electronically controlled, continuously variable transmission, the method comprising the steps of:

detecting if a braking operation is present and, during braking operation, continuously adjusting the transmission by changing the reduction gear ratio thereof to support the brakes of the motor vehicle to define a brake-supporting mode of operation; and, in said brake-supporting mode of operation, generating a correspondingly dimensioned motor braking torque by correspondingly adjusting said reduction gear ratio in dependence upon the magnitude of the longitudinal deceleration resulting from the braking action of the brakes.

\* \* \* \* \*